United States Patent
Bennett

(10) Patent No.: US 9,829,299 B1
(45) Date of Patent: Nov. 28, 2017

(54) DEVICE AND METHOD FOR DETERMINING AND COMPARING DISTANCES BETWEEN BALLS IN THE GAME OF BOCCE

(71) Applicant: Bruce A. Bennett, San Rafael, CA (US)

(72) Inventor: Bruce A. Bennett, San Rafael, CA (US)

(*) Notice: Subject to any disclaimer, the term of this patent is extended or adjusted under 35 U.S.C. 154(b) by 0 days.

(21) Appl. No.: 15/608,552

(22) Filed: May 30, 2017

(51) Int. Cl.
| | | |
|---|---|---|
| A63B 67/08 | (2006.01) | |
| G01B 3/10 | (2006.01) | |
| G01B 5/00 | (2006.01) | |
| G01B 21/04 | (2006.01) | |
| G01B 21/16 | (2006.01) | |
| A63B 67/06 | (2006.01) | |

(52) U.S. Cl.
CPC .......... *G01B 5/0023* (2013.01); *A63B 67/068* (2013.01); *G01B 3/1084* (2013.01); *G01B 21/047* (2013.01); *G01B 21/16* (2013.01); *A63B 67/06* (2013.01)

(58) Field of Classification Search
CPC ... G01B 3/02; G01B 3/04; G01B 3/10; G01B 3/1084; G01B 2003/1066; G01B 2003/1079; A63B 67/06; A63B 67/068; A63B 71/06
USPC ............ 33/759, 760, 770; D10/71, 72
See application file for complete search history.

(56) References Cited

U.S. PATENT DOCUMENTS

| | | | | |
|---|---|---|---|---|
| 1,402,589 A | | 1/1922 | Farrand | |
| 2,396,877 A | * | 3/1946 | Peterson | G01B 3/1061 24/569 |
| 2,663,941 A | * | 12/1953 | Dart | G01B 3/1071 33/768 |
| 3,289,305 A | * | 12/1966 | Norton | G01B 3/1084 33/494 |
| 3,744,134 A | * | 7/1973 | Zima, Jr. | G01B 3/1071 33/768 |
| 4,333,237 A | * | 6/1982 | Carbone | A63B 67/068 33/289 |
| 4,827,622 A | * | 5/1989 | Makar | G01B 3/1071 33/770 |
| 4,999,924 A | * | 3/1991 | Shields | G01B 3/1071 33/668 |
| 5,125,669 A | * | 6/1992 | Kanda | A63B 67/068 273/118 R |
| 5,189,801 A | * | 3/1993 | Nicely | G01B 3/1071 33/42 |

(Continued)

FOREIGN PATENT DOCUMENTS

| | | | | |
|---|---|---|---|---|
| DE | 29619717 U1 | * | 3/1998 | .......... A63B 67/068 |
| DE | 202016002325 U1 | * | 5/2016 | .......... G01B 3/1084 |

(Continued)

Primary Examiner — R. A. Smith
(74) Attorney, Agent, or Firm — Edward S. Wright

(57) ABSTRACT

Device and method for determining and comparing distances between balls in the game of bocce in which a marker block is magnetically attached to a measuring tape in a position corresponding to the distance between a first thrown ball and a target ball, and the tape with the marker attached is then used to compare that distance with the distance between a second thrown ball and the target ball to determine which of the two thrown balls is closer to the target ball.

18 Claims, 2 Drawing Sheets

(56) References Cited

U.S. PATENT DOCUMENTS

| | | | | |
|---|---|---|---|---|
| 5,295,308 | A * | 3/1994 | Stevens et al. | G01B 3/1071 33/42 |
| 5,606,803 | A * | 3/1997 | O'Sullivan | G01B 3/1071 33/759 |
| 5,815,940 | A * | 10/1998 | Valentine, Sr. | G01B 3/1071 33/759 |
| 6,434,854 | B1 | 8/2002 | MacColl et al. | |
| 6,754,974 | B2 * | 6/2004 | Bassolino et al. | A63B 67/068 33/1 G |
| 6,938,354 | B2 * | 9/2005 | Worthington | C07K 16/40 33/668 |
| 7,059,064 | B2 * | 6/2006 | Brohammer | A63B 67/068 273/108 |
| 7,334,344 | B2 | 2/2008 | Scarborough | |
| 7,900,370 | B1 * | 3/2011 | Treige | G01B 3/1061 33/770 |
| 8,760,633 | B2 * | 6/2014 | Neary | A63B 67/068 356/4.01 |
| 8,801,546 | B2 * | 8/2014 | Roark et al. | A63B 67/068 33/759 |
| 8,832,958 | B2 * | 9/2014 | Mabey | G01B 3/1005 33/758 |
| 9,194,695 | B2 * | 11/2015 | Dascanio | A63B 59/00 |
| 2004/0049938 | A1 * | 3/2004 | Bassolino et al. | A63B 67/068 33/759 |
| 2009/0090017 | A1 * | 4/2009 | Smiroldo | G01B 3/1056 33/770 |
| 2011/0116071 | A1 * | 5/2011 | Neary | A63B 67/068 356/3 |
| 2011/0179661 | A1 * | 7/2011 | Delneo et al. | G01B 3/1056 33/758 |
| 2014/0317943 | A1 * | 10/2014 | DeMartinis et al. | G01B 3/1084 33/668 |
| 2015/0075022 | A1 * | 3/2015 | Bitton et al. | G01B 3/1084 33/760 |
| 2015/0146003 | A1 * | 5/2015 | Seita | G06T 7/60 348/157 |

FOREIGN PATENT DOCUMENTS

| | | | | |
|---|---|---|---|---|
| FR | 2502966 A1 * | 10/1982 | | A63B 67/068 |
| FR | 2584613 A1 * | 1/1987 | | A63B 67/068 |
| FR | 2588652 A1 * | 4/1987 | | A63B 67/068 |
| FR | 2878321 A1 * | 5/2006 | | A63B 67/068 |
| GB | 2391943 A * | 2/2004 | | A63B 67/068 |
| GB | 2507355 A * | 4/2014 | | A63B 67/068 |
| JP | 2007044315 A * | 2/2007 | | A63B 71/02 |
| JP | 2015116350 A * | 6/2015 | | A63B 71/06 |
| WO | WO 2010087502 A1 * | 8/2010 | | G01B 3/1084 |

* cited by examiner

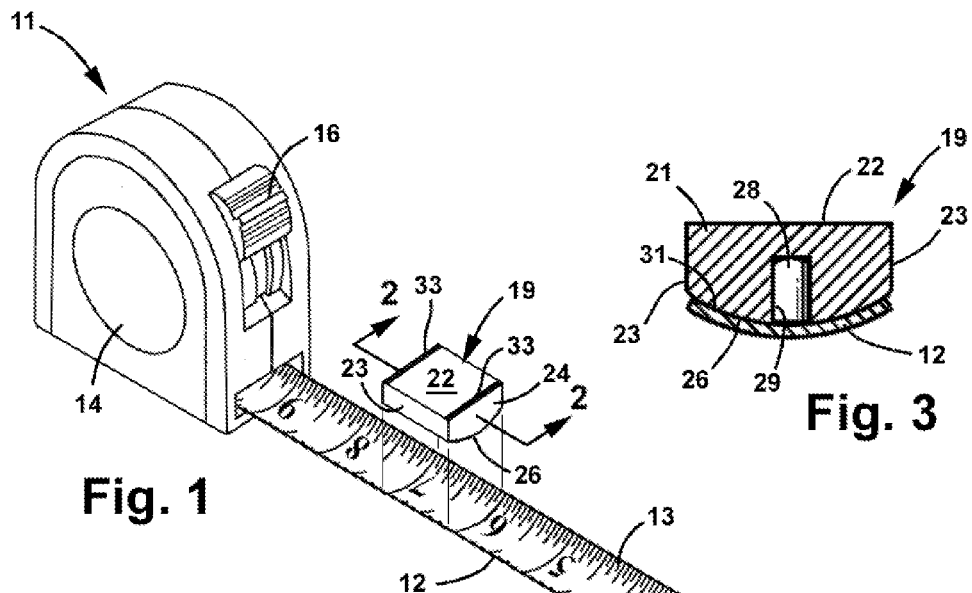
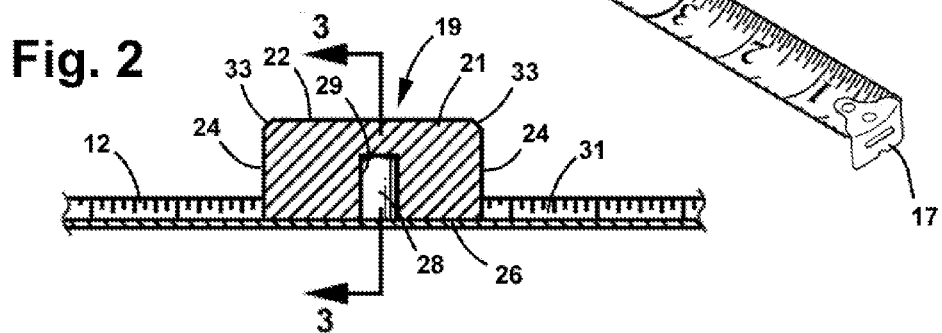
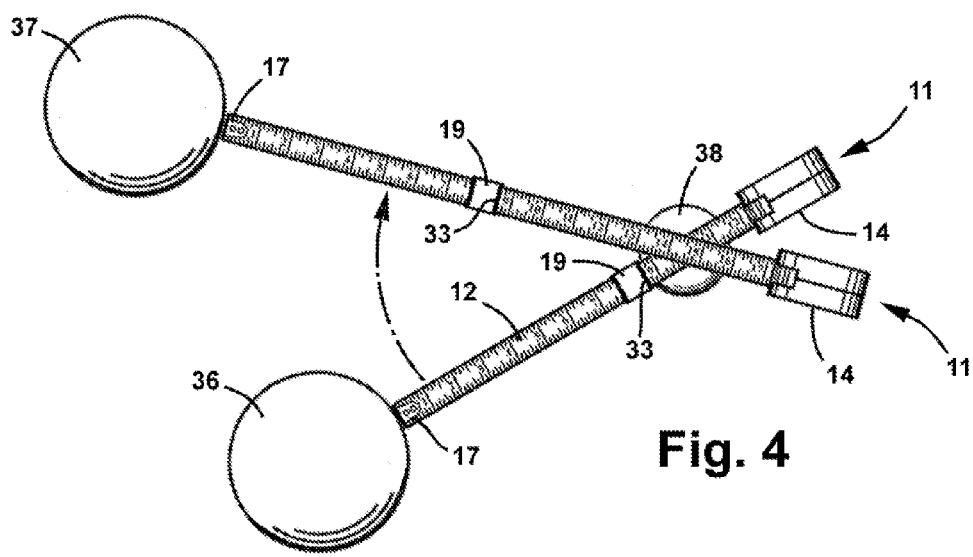

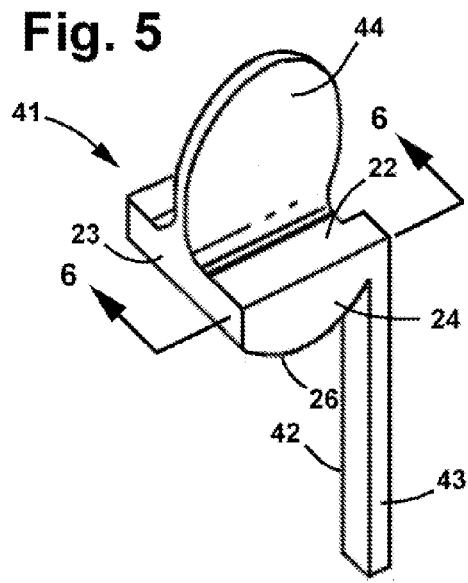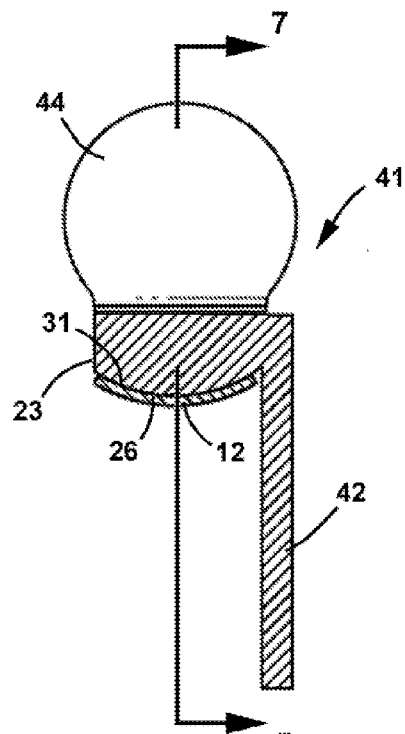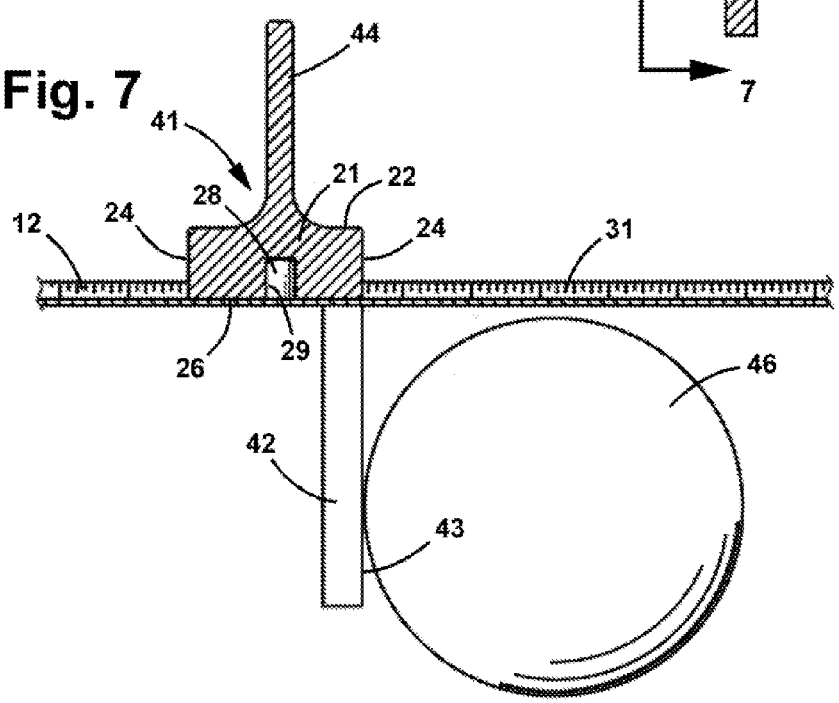

DEVICE AND METHOD FOR DETERMINING AND COMPARING DISTANCES BETWEEN BALLS IN THE GAME OF BOCCE

BACKGROUND OF THE INVENTION

Field of Invention

This invention relates generally to the game of bocce and, more particularly, to a device and method for determining and comparing distances between balls thrown by players and a target ball or pallino.

Related Art

In the game of bocce, where points are awarded to players who throw or roll their balls (bocces) the closest to a target ball or pallino, a number of different techniques have been employed in measuring and comparing the distances between the bocces and the pallino. Such techniques have ranged from the use of feet and fingers to the use of relatively complex and expensive systems utilizing lasers and cameras for measuring and comparing the distances.

Examples of such techniques are found in U.S. Pat. Nos. 5,125,669, 6,754,974, 7,059,064, 8,760,633, and 9,194,695, and in Published U.S. Patent Applications Nos. 2004/0049938, 2011/0116071, 2011/0179661, and 2015/0146003, all of which are subject to certain limitations and disadvantages.

Objects and Summary of the Invention

It is, in general, an object of the invention to provide a new and improved device and method for determining and comparing distances between balls in the game of bocce.

Another object is to provide a device and method of the above character which overcome the limitations and disadvantages of techniques heretofore employed.

These and other objects are achieved in accordance with the invention by providing a device and method for determining and comparing distances between balls in the game of bocce in which a marker block is magnetically attached to a measuring tape in a position corresponding to the distance between a first thrown ball and a target ball, and the tape with the marker attached is then used to compare that distance with the distance between a second thrown ball and the target ball to determine which of the two thrown balls is closer to the target ball.

BRIEF DESCRIPTION OF THE DRAWINGS

FIG. 1 is an isometric view, partly exploded, of one embodiment of a device according to the invention for determining and comparing distances between balls in the game of bocce.

FIG. 2 is a fragmentary sectional view taken along line 2-2 of FIG. 1.

FIG. 3 is a cross-sectional view taken along line 3-3 of FIG. 2.

FIG. 4 is a plan view illustrating the use of the invention in measuring and comparing the distances between two thrown balls and a target ball in the game of bocce.

FIG. 5 is an isometric view of another embodiment of marker block for use in the invention.

FIG. 6 is a cross-sectional view taken along line 6-6 of FIG. 5.

FIG. 7 is a cross-sectional view taken along line 7-7 of FIG. 6.

DETAILED DESCRIPTION

As illustrated in FIGS. 1-3, the device for determining and comparing distances between balls in the game of bocce includes a measuring tape 11 of conventional design having a flexible steel blade 12 with distance markings or indicia 13 on its upper side. When not in use, the blade is coiled up inside a case 14 of a size that can be held in the hand. The blade is retracted and coiled by a spring within the case and can be locked in an extended position by a brake operated by a button 16 outside the case. A hook or tab 17 at the outer end of the blade provides means for withdrawing the blade from the case, hooking onto or abutting against objects for measurement, and limiting travel of the blade into the case during retraction.

The blade has an upwardly concave lateral curvature which imparts stiffness to the blade and allows it to remain substantially straight when extended.

A marker block 19 is attached to the tape blade for use in determining and comparing distances between thrown balls and a target ball on a bocce court. The marker block has a generally rectangular body 21 with a substantially planar top 22, substantially planar ends 23, substantially planar sides 24, and a semi-cylindrical lower surface 26 with a downwardly convex lateral curvature that matches the lateral upwardly concave curvature of the blade.

The marker block is secured to the blade of the tape by a magnet 28 embedded in the block. In the embodiment illustrated, the magnet is a cylindrical bar magnet which is mounted in a vertically extending blind bore 29 that opens through the lower surface of the block, and the block is fabricated of a rigid material such as wood, plastic, or non-ferrous metal. However, it should be understood that the magnet can be of any suitable type, mounted to the block in any suitable manner and that the block itself can be a magnet, if desired. When the block is attached to the blade, it is held securely in a fixed position by the magnetic forces produced by the magnet, with the entire lower surface 26 of the block in firm engagement with the upper surface 31 of the blade.

The ends of the marker block serve as reference points or guides that can be aligned with the sides of the balls to determine where the block should be placed on the tape. In the embodiment illustrated, the upper edges of the ends are beveled to form laterally extending reference lines 33. To make these lines more visible and easier to see, the beveled edges can be a different color than the rest of the block. Thus, for example, with a wooden block having a dark finish, the beveled edges could be painted white.

Use of the device, and therein the method of the invention, is illustrated in FIG. 4 where the distances between two thrown balls or bocces 36, 37 and a target ball or pallino 38 are measured and compared. The free end of tape blade 12 is held against the side of one of the thrown balls, which in this case is ball 36, with the blade extending toward and over the center of pallino 38. Marker block 19 is then placed on the tape with one of its reference lines 33 aligned with the side of the pallino facing the bocce so that the position of the block corresponds to the distance between the first bocce and the pallino. Either reference line can be used as long as the same line is used for all measurements. In this particular example, the reference line at the front of the block is used, and the tape indicates that the distance between bocce 36 and the pallino is 8⅝ inches.

With the marker block still attached to the tape in the position corresponding to the distance between the first bocce and the pallino, the tape is repositioned between the second bocce 37 and the pallino, with the free end of the blade against the side of the bocce and the blade extending toward and over the center of the pallino. The tape shows that bocce 37 is 13 inches from the pallino, and the marker block is well short of the pallino, indicating that bocce 36 is substantially closer to the pallino than bocce 37.

With thrown balls or bocces that are twice the size of the pallino, as is the case in this example, when the tape is extended horizontally from the sides of the bocces, it grazes the top of the pallino, making it easy to align the marker block accurately with the side of the pallino as it is attached to the tape.

In the embodiment of FIGS. 5-7, marker block 41 in is generally similar to marker block 19, and like reference numerals designate corresponding elements in the two embodiments. Marker block 41 differs from marker block 19 in that it has a downwardly extending alignment pin or guide 42 at one end of the body. The pin is offset laterally to one side of the body and has a vertically extending face 43 that is coplanar with one of the end walls 24 of the body. The pin preferably has a length greater than one-half of the diameter of a ball so that it can engage the surface of the ball in an equatorial plane where horizontal diameter of the ball is the greatest while the block is being aligned with the ball and attached to the tape.

Marker block 41 also has a disk-like tab 44 which extends upwardly from the body and serves as a handle or grip that can be grasped by a person using the block. The tab extends laterally across the central portion of block, midway between the end walls, and has a generally circular peripheral contour.

In the embodiment illustrated, guide pin 42 and tab 44 are formed integrally with and of the same material as the body 21 of the block. If desired, however, the guide pin and tab can be fabricated of other materials and attached to the body by any suitable means such as gluing.

In use, the free end of tape 12 is held against the side of a first ball (not shown), with the tape extending toward and over the center of a second ball 46, as in the embodiment of FIGS. 1-4. Marker block 41 is then lowered onto the tape, with guide pin 42 to one side of the tape, and the face 43 of the pin in moved into abutting engagement with the side of the second ball facing the first ball. As in the previous embodiment, the marker is held securely in a fixed position on the tape by magnetic forces produced by magnet 28, with the lower surface 26 of the block in firm engagement with the upper surface 31 of tape blade 12 and alignment pin 42 passing to one side of the tape blade.

With the marker block attached to the tape in the position corresponding the distance between the first two balls, the tape is then positioned between two other balls to compare the distances between the balls, as in the embodiment of FIGS. 1-4.

The invention has a number of important features and advantages. It provides a reliable and accurate way of determining and comparing distances between balls in the game of bocce. It is economical and easy to use, and it is highly portable.

It is apparent from the foregoing that a new and improved device and method for determining and comparing distances between balls in the game of bocce have been provided. While only certain presently preferred embodiments have been described in detail, as will be apparent to those familiar with the art, certain changes and modifications can be made without departing from the scope of the invention as defined by the following claims.

The invention claimed is:

1. A device for determining and comparing distances between balls in the game of bocce, comprising a measuring tape having an elongated blade which can be extended from a handheld case and locked in an extended position, a marker block adapted to be placed on the extended blade in a position corresponding to the distance between two of the balls, and means for magnetically securing the marker block to the blade in the position corresponding to the distance between the balls.

2. The device of claim 1 wherein the means for magnetically securing the marker block to the blade comprises a bar magnet.

3. The device of claim 1 wherein the means for magnetically securing the marker block to the blade comprises a magnet embedded in the marker block.

4. The device of claim 1 wherein the tape blade has an upwardly concave lateral curvature, and the marker block has a downwardly convex lateral curvature that matches the lateral curvature of the blade.

5. The device of claim 1 wherein the marker block includes a guide that can be aligned with one of the balls in positioning the block on the blade.

6. The device of claim 5 wherein the guide comprises a reference line which extends laterally across the upper side of the block.

7. The device of claim 5 wherein the guide comprises a pin that extends downwardly from the block for lateral engagement with one of the balls.

8. A device for determining and comparing distances between balls in the game of bocce, comprising a measuring tape having an elongated blade which can be extended from a handheld case and locked in an extended position, a marker block adapted to be placed on the extended blade in a position corresponding to the distance between two of the balls, the marker block having a generally rectangular body with a laterally extending beveled edge which is of a different color than the rest of the block and serves as a guide that can be aligned with one of the balls in positioning the block on the blade, and means for securing the marker block to the blade in the position corresponding to the distance between the balls.

9. A device for determining and comparing distances between balls in the game of bocce, comprising a measuring tape having an elongated blade with an upper surface having an upwardly concave lateral curvature, a generally rectangular marker block which has a lower surface with a downwardly convex lateral curvature and is magnetically secured to the blade in a fixed position corresponding to the distance between two of the balls with substantially the entire lower surface of the block in firm engagement with the upper surface of the blade.

10. The device of claim 9 wherein the marker block is secured to the blade of the tape by magnetic forces produced by a magnet mounted in the block.

11. The device of claim 9 wherein the marker block includes a guide that can be aligned with one of the balls in positioning the block on the blade.

12. The device of claim 11 wherein the guide comprises a reference line which extends laterally across the upper side of the block.

13. The device of claim 11 wherein the guide comprises a pin that extends downwardly from the block for lateral engagement with one of the balls.

14. The device of claim 9 wherein the marker block has a laterally extending beveled upper edge which is of a different color than the rest of the block and serves as a guide that can be aligned with one of the balls in positioning the block on the blade.

15. A method of determining and comparing distances between thrown balls and a target ball in the game of bocce, comprising the steps of: determining the distance between a first one of the thrown balls and the target ball by holding one end of a measuring tape against one of the balls with the remainder of the tape extending toward the other ball, magnetically attaching a marker block to the tape in alignment with the other ball in a position corresponding to the distance between the first thrown ball and the target ball, repositioning the tape between the target ball and a second one of the thrown balls, and comparing the distance between the end of the tape and the marker block with the distance between the second thrown ball and the target ball to determine which of the two thrown balls is closer to the target ball.

16. The method of claim 15 wherein the thrown balls are approximately twice as large as the target ball, and the end of the tape is held against the sides of the thrown balls with the tape passing over the target ball while attaching the marker block and comparing the distances between the balls.

17. The method of claim 15 wherein the marker block is aligned with the balls by aligning a reference point on the block with the sides of the balls.

18. The method of claim 15 wherein the marker block has a vertically extending pin depending therefrom, and the block is aligned with the other ball by bringing the pin into lateral engagement with the other ball.

* * * * *